(12) United States Patent
Zha et al.

(10) Patent No.: US 11,702,538 B2
(45) Date of Patent: Jul. 18, 2023

(54) CHEMICAL PRODUCTS FOR ADHESIVE APPLICATIONS

(71) Applicant: Hexion Inc., Columbus, OH (US)

(72) Inventors: Charles Zha, Stafford, TX (US); Jan Beetge, Stafford, TX (US)

(73) Assignee: HEXION INC., Columbus, OH (US)

( * ) Notice: Subject to any disclaimer, the term of this patent is extended or adjusted under 35 U.S.C. 154(b) by 431 days.

(21) Appl. No.: 16/791,539

(22) Filed: Feb. 14, 2020

(65) Prior Publication Data

US 2020/0308394 A1 Oct. 1, 2020

Related U.S. Application Data

(60) Provisional application No. 62/808,611, filed on Feb. 21, 2019.

(51) Int. Cl.
*C08L 63/00* (2006.01)
*C08L 77/06* (2006.01)
*C08L 79/02* (2006.01)
*C08G 59/24* (2006.01)
*C09J 163/00* (2006.01)
*C09J 177/06* (2006.01)

(52) U.S. Cl.
CPC ............ *C08L 63/00* (2013.01); *C08G 59/245* (2013.01); *C08L 77/06* (2013.01); *C08L 79/02* (2013.01); *C09J 163/00* (2013.01); *C09J 177/06* (2013.01); *C08L 2312/00* (2013.01)

(58) Field of Classification Search
CPC .................................................. C08L 77/06–12
See application file for complete search history.

(56) References Cited

U.S. PATENT DOCUMENTS

2017/0275414 A1* 9/2017 Kwisnek ................ B33Y 10/00
2017/0369770 A1* 12/2017 Zha ........................ C09J 133/02

* cited by examiner

*Primary Examiner* — Ana L. Woodward

(57) ABSTRACT

The embodiments described herein generally relate to methods and chemical compositions for coating substrates with a composition. In one embodiment, a composition is provided including a first resin, a second resin different than the first resin, and a cross-linking agent.

9 Claims, 2 Drawing Sheets

CHEMICAL PRODUCTS FOR ADHESIVE APPLICATIONS

RELATED APPLICATION DATA

This application claims benefit to U.S. Provisional Application No. 62/808,611, filed Feb. 21, 2019, of which the entire contents of the application are incorporated by reference herein.

FIELD OF THE INVENTION

The present invention relates to compositions and products in various applications requiring tackiness. The present invention particularly relates to compositions and products for reducing or mitigating the production of dust from the handling of substrates, and also for fines control, flow-back control, and conductivity enhancements in hydraulic fracturing operations.

BACKGROUND

Proppant flowback is a very common problem in fracture stimulated wells. Proppant flowback results in increased well maintenance costs and decreased well production for the productive life of the well. The most common way to reduce proppant flowback is to use curable resin coated proppant (RCP), which has been used for over 30 years. However, RCPs have higher cost compared to uncoated proppant, there can be erosion of resin coating during loading/off loading of the RCPs, and customers often end of paying for unused RCP on location.

Another way to reduce proppant flowback is to make the proppant surface sticky. Tacky chemicals are added to the dry proppant in the frac blender and screw sand hopper at an adjustable concentration to reduce proppant flowback. The tacky chemicals cost less than traditional RCP, eliminate RCP coating erosion, and allow customers to pay for only the proppant coated and pumped downhole. This technology can also be applied in remote locations and use locally sourced substrates where RCP is not readily available.

However, current tacky chemicals for proppants have high tackiness at room temperature, which can result in clogging equipment and wellbores during operation. Additionally, traditional RCPs and tacky chemicals have less than desirable bonding between proppant grains.

It would be desirable if compositions and methods could be devised that would adhere the fines to the sand, reduce or eliminate proppant flowback, and prevent fines migration and aggregation to preserve the conductivity of the channels.

SUMMARY

The embodiments described herein generally relate to methods and chemical compositions for coating substrate with an adhesive composition. In one embodiment, a composition is provided comprising a reaction product of a polyacid selected from the group consisting of an aromatic polyacid, an aliphatic polyacid, an aliphatic polyacid with an aromatic group, and combinations thereof, or a diglycidyl ether; and a polyamine; and one or more compounds selected from the group consisting of a branched aliphatic acid, a cyclic aliphatic acid with a cyclic aliphatic group, a linear aliphatic acid, and combinations thereof.

In one embodiment, an adhesive composition is provided comprising a reaction product of a polyacid selected from the group consisting of an aromatic polyacid, an aliphatic polyacid, an aliphatic polyacid with an aromatic group, and combinations thereof, or a diglycidyl ether; and a C2-C18 polyamine; and one or more compounds selected from the group consisting of a branched aliphatic acid having C2-C26 alkyl group, a cyclic aliphatic acid with C7-C30 cyclic aliphatic group, a linear aliphatic acid having C2-C26 alkyl group, and combinations thereof.

In another embodiment, a particulate material is provided, including a substrate and an adhesive composition including a reaction product of a polyacid selected from the group consisting of an aromatic polyacid, an aliphatic polyacid, an aliphatic polyacid with an aromatic group, and combinations thereof, or a diglycidyl ether; and a polyamine; and one or more compounds selected from the group consisting of a branched aliphatic acid, a cyclic aliphatic acid with a cyclic aliphatic group, a linear aliphatic, and combinations thereof. In another embodiment, a gravel pack is provided including the particle material.

In another embodiment, a process for forming a proppant is provided, including providing a substrate, and disposing an adhesive composition thereon.

In another embodiment, a fracturing fluid composition is provided including a fracturing fluid and an additive composition comprising a reaction product of a diglycidyl ether or a polyacid selected from the group consisting of an aromatic polyacid, an aliphatic polyacid, an aliphatic polyacid with an aromatic group, and combinations thereof; and a polyamine; and one or more compounds selected from the group consisting of a branched aliphatic acid having C2-C26 alkyl group, a cyclic aliphatic acid with C7-C30 cyclic aliphatic group, a linear aliphatic acid having C2-C26 alkyl group, and combinations thereof.

In another embodiment, a method for treating a subterranean formation is provided including injecting a fracturing fluid composition into the subterranean formation, wherein the fracturing fluid composition including a fracturing fluid and an additive composition comprising a reaction product of a diglycidyl ether or a polyacid selected from the group consisting of an aromatic polyacid, an aliphatic polyacid, an aliphatic polyacid with an aromatic group, and combinations thereof; and a polyamine; and one or more compounds selected from the group consisting of a branched aliphatic acid having C2-C26 alkyl group, a cyclic aliphatic acid with C7-C30 cyclic aliphatic group, a linear aliphatic acid having C2-C26 alkyl group, and combinations thereof.

In another embodiment a composition is provided including a first resin, a second resin, and a cross-linking agent. The second resin is different than the first resin.

In another embodiment a composition is provided including three or more resins, wherein each resin is different than the other resins.

In another embodiment a composition is provided including a first resin, a second resin, a third resin, and a cross-linking agent. Each of the first resin, the second resin, and the third resin are different than the other two resins.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

So that the manner in which the features, advantages and objects of the invention, as well as others which will become apparent, are attained, and can be understood in more detail, more particular description of the invention briefly summarized above may be had by reference to the embodiments thereof which are illustrated in the appended drawings that form a part of this specification. It is to be noted, however, that the drawings illustrate only a preferred embodiment of the invention and are therefore not to be considered limiting of its scope as the invention may admit to other equally effective embodiments.

DETAILED DESCRIPTION

Figure 1:
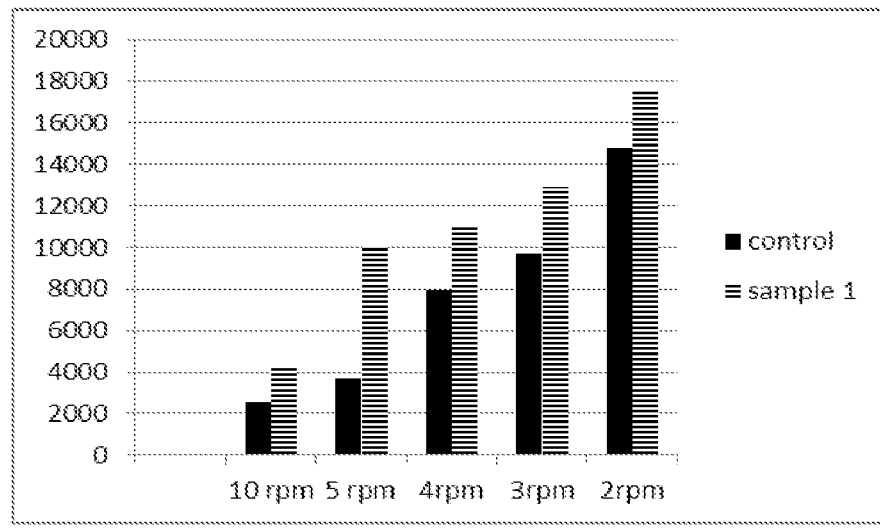
FIG. 1 is a graph showing the comparison of viscosity of sand slurry coated with Sample 1 of this invention versus uncoated sand as a control.

Embodiments of the invention are compositions for coating substrates. In one embodiment, a particulate material is formed by coating a substrate material with an adhesive composition. In one embodiment, a composition is generally considered adhesive when the composition before or after application exhibits adhesive strength above 1 N/m$^2$ or work of adhesion above 1 J/m$^2$.

The substrate material may be any organic or inorganic particulate material.

Suitable inorganic particulate materials include inorganic materials (or substrates), such as exfoliated clays (for example, expanded vermiculite), exfoliated graphite, blown glass or silica, hollow glass spheres, foamed glass spheres, cenospheres, foamed slag, sand, naturally occurring mineral fibers, such as zircon and mullite, ceramics, sintered ceramics, such as sintered bauxite or sintered alumina, other non-ceramic refractories such as milled or glass beads, and combinations thereof. Exemplary inorganic substrate materials may be derived from silica sand, milled glass beads, sintered bauxite, sintered alumina, mineral fibers such as zircon and mullite, or a combination comprising one of the inorganic substrate materials.

Suitable organic particulate materials include organic polymer materials, naturally occurring organic substrates, and combinations thereof. The organic polymer materials may comprise any of the polymeric materials described herein that are carbon-based polymeric materials. Another particulate material is dust, which can be organic or inorganic depending on the source material from which it is derived.

Naturally occurring organic substrates are ground or crushed nut shells, ground or crushed seed shells, ground or crushed fruit pits, processed wood, ground or crushed animal bones, or a combination comprising at least one of the naturally occurring organic substrates. Examples of suitable ground or crushed shells are shells of nuts such as walnut, pecan, almond, ivory nut, brazil nut, ground nut (peanuts), pine nut, cashew nut, sunflower seed, Filbert nuts (hazel nuts), macadamia nuts, soy nuts, pistachio nuts, pumpkin seed, or a combination comprising at least one of the foregoing nuts. Examples of suitable ground or crushed seed shells (including fruit pits) are seeds of fruits such as plum, peach, cherry, apricot, olive, mango, jackfruit, guava, custard apples, pomegranates, watermelon, ground or crushed seed shells of other plants such as maize (e.g., corn cobs or corn kernels), wheat, rice, jowar, or a combination comprising one of the foregoing processed wood materials such as, for example, those derived from woods such as oak, hickory, walnut, poplar, mahogany, including such woods that have been processed by grinding, chipping, or other form of particalization. An exemplary naturally occurring substrate is a ground olive pit.

The substrate may also be a composite particle, such as at least one organic component and at least one inorganic component, two or more inorganic components, and two or more organic components. For example, the composite may comprise an organic component of the organic polymeric material described herein having inorganic or organic filler materials disposed therein. In a further example, the composite may comprise an inorganic component of any of the inorganic polymeric material described herein having inorganic or organic filler materials disposed therein.

Inorganic or organic filler materials include various kinds of commercially available minerals, fibers, or combinations thereof. The minerals include at least one member of the group consisting of silica (quartz sand), alumina, mica, meta-silicate, calcium silicate, calcine, kaoline, talc, zirconia, boron, glass, and combinations thereof. Fibers include at least one member selected from the group consisting of milled glass fibers, milled ceramic fibers, milled carbon fibers, synthetic fibers, and combinations thereof.

The substrate material may have any desired shape such as spherical, egg shaped, cubical, polygonal, or cylindrical, among others. It is generally desirable for the substrate material to be spherical in shape. Substrate materials may be porous or non-porous. Preferred substrate particles are hard and resist deforming. Alternatively, the substrate material may be deformable, such as a polymeric material. Deforming is different from crushing wherein the particle deteriorates usually creating fines that can damage fracture conductivity. In one embodiment, the inorganic substrate material does not melt at a temperature below 450° F. or 550° F.

For proppant formation, the substrate may be in the form of individual particles that may have a particle size in the range of ASTM sieve sizes (USA Standard Testing screen numbers) from about 6 to 200 mesh (screen openings of about 3360 μm or about 0.132 inches to about 74 μm or 0.0029 inches). Typically for proppant or gravel pack individual particles of the particulate substrate have a particle size in the range of USA Standard Testing screen numbers from about 8 to about 100 mesh (screen openings of about 2380 μm or about 0.0937 inches to about 150 μm or about 0.0059 inches), such as from 20 to 80 mesh (screen openings of about 841 μm or about 0.0311 inches to about 177 μm or 0.007 inches), for example, 40 to 70 mesh, (screen openings of about 400 μm or about 0.0165 inches to about 210 μm or 0.0083 inches) may be used to define the particle size.

In one embodiment of the invention, the proppant material size is 20/40 mesh, 30/50 mesh, 40/70 mesh, 70/140 mesh (commonly referred to as "100 mesh"). A size of a 20/40 mesh is commonly used in the industry as a material having a size between a 20 mesh and 40 mesh as described herein. Smaller mesh proppants, such as 40/70 mesh proppants, may be used in low viscosity fracture fluids, and larger mesh proppants, such as 20/40 mesh proppants, may be used in high viscosity fracture fluids.

In one embodiment, the adhesive composition includes a reaction product of a polyacid and a polyamine; and one or more compounds selected from the group consisting of a branched aliphatic acid having C2-C26 alkyl group, a cyclic aliphatic acid with C7-C30 cyclic aliphatic group, a linear aliphatic acid having C2-C26 alkyl group, and combinations thereof. The reaction product of a polyacid and a polyamine forms an adduct.

The polyamine may be any amine having two or more amine groups. Suitable polyamines include diamines. Suitable diamines include polyethylenepolyamines, C2-C12 linear diamines, cyclic diamines, diamine with aromatic content, polyetherdiamines, polyoxyalkylene diamines, and combinations thereof. Examples of diamines include diamines selected from the group consisting of ethylenediamine, diethylenetriamine (DETA), triethylenetetraamine, bis(aminomethyl)cyclohexane, phenylenediamine, naphthalene diamine, xylene diamine, polypropylene oxide diamine, and combinations thereof. Other suitable amines include higher amines from reactions of diamines such as xylenediamine with epichlorohydrin such as Gaskamine 328 (Mitsubishi Gas Chemical Co). Other polyamines include triamines and tetramines, for example, polyethertriamine (Jeffamine T-403 available from Huntsman of Houston Tex.) and triethylenetetramine (TETA), and combinations thereof.

In one embodiment of the polyamines, a diamine is selected from the group consisting of polyethylenepolyamines, C2-C12 diamines, polyetherdiamines, and combinations thereof. Examples of these diamines include diamines selected from the group consisting of ethylenediamine, diethylenetriamine, triethylenetetraamine, and combinations thereof.

The reaction product includes from about 10 wt. % to about 60 wt. %, such as from about 15 wt. % to about 45 wt. %, of the polyamine; and from about 40 wt. % to about 90 wt. %, such as from about 55 wt. % to about 85 wt. % of the polyacid based on the weight of the reaction product. The polyamine and the polyacid may also be provided to form the reaction mixture at a molar ratio of polyamine to polyacid of about 2:1 to about 1:2.

The polyacid may be selected from the group consisting of an aromatic polyacid, an aliphatic polyacid, an aliphatic polyacid with an aromatic group, and combinations thereof.

The polyacid may comprise a diacid. Suitable diacids include diacids selected from the group consisting of aromatic diacid, aliphatic diacid, aliphatic diacid with an aromatic group, and combinations thereof. The diacids may be saturated diacids or unsaturated diacids. The diacids may also be C2-C24 diacids and/or dimerized fatty acids. Suitable examples of diacids include terephthalic acid, phthalic acid, isophthalic acid, oxalic acid, malonic acid, succinic acid, glutaric acid, adipic acid, pimelic acid, suberic acid, azelaic acid, maleic acid, fumaric acid, muconic acid, and combinations thereof.

The aliphatic diacid with aromatic group(s) block(s) between the acid groups may be represented by following general formulas:

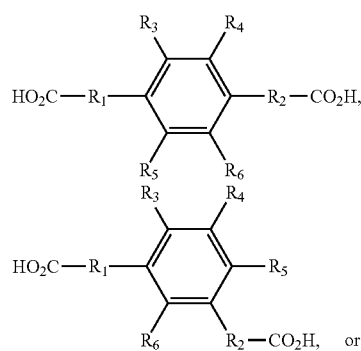

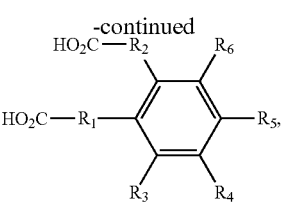

and combinations thereof, wherein each of R1 and R2 are independent functional groups selected from the group consisting of C1-C12 alkyl, alkanoxy, alkylamino, and alkylcarboxy, and each of R3, R4, R5, and R6 are independent functional groups selected from the group consisting of hydroxyl (—OH), amino, nitro, sulfonyl, C1-C12 alkyl, alkanoxy, alkylamino, and alkylcarboxy.

The aromatic diacids may also be substituted with a functional group selected from the group consisting of amine, hydroxyl (—OH), C1-C12 alkyl, alkylamino, alkanoxy, alkylenoxy, alkylcarboxy, alkylnitro, alkylsulfonyl, and wherein the substitution on the aromatic ring is in one or more positions. For example, the terephthalic acid, the phthalic acid, and the isophthalic acid, may be substituted with a functional group selected from the group consisting of amine, hydroxyl (—OH), C1-C12 alkyl, alkylamino, alkanoxy, alkylenoxy, alkylcarboxy, alkylnitro, alkylsulfonyl, and wherein the substitution on the aromatic ring is in one or more positions.

In one embodiment, the adhesive composition includes a reaction product of a triacid and a polyamine; and one or more compounds selected from the group consisting of a branched aliphatic acid having C2-C26 alkyl group, a cyclic aliphatic acid with C7-C30 cyclic aliphatic group, a linear aliphatic acid having C2-C26 alkyl group, and combinations thereof. The reaction product of the triacid and the polyamine forms an adduct.

Suitable triacid include citric acid, isocitric acid, aconitic acid, propane-1,2,3-tricarboxylic acid, trimesic acid, and the combinations thereof.

In one embodiment, the adhesive composition includes a reaction product of a tetraacid and a polyamine; and one or more compounds selected from the group consisting of a branched aliphatic acid having C2-C26 alkyl group, a cyclic aliphatic acid with C7-C30 cyclic aliphatic group, a linear aliphatic acid having C2-C26 alkyl group, and combinations thereof. The reaction product of the tetraacid and the polyamine forms an adduct.

Suitable tetraacids include ethylenediaminetetraacetic acid (EDTA), furantetracarboxylic acid, methanetetracarboxylic acid, ethylenetetracarboxylic acid, benzenetetracarboxylic acid, and benzoquinonetetracarboxylic acid, and the combinations thereof.

In another embodiment, the adhesive composition includes a reaction product of a polyamine and a diglycidyl ether; and one or more compounds selected from the group consisting of a branched aliphatic acid having C2-C26 alkyl group, a cyclic aliphatic acid with C7-C30 cyclic aliphatic group, a linear aliphatic acid having C2-C26 alkyl group, and combinations thereof. The reaction product of the diglycidyl ether and the polyamine forms an adduct.

The reaction product includes from about 10 wt. % to about 60 wt. %, such as from about 15 wt. % to about 45 wt. %, of the polyamine, and from about 40 wt. % to about 90 wt. %, such as from about 55 wt. % to about 85 wt. %, of the diglycidyl ether based on the weight of the reaction product. The polyamine and the diglycidyl ether may also be provided to form the reaction mixture at a molar ratio of polyamine to diglycidyl ether of about 2:1 to about 1:2.

Examples of suitable diglycidyl ether selected from the group consisting of diglycidyl ether of bisphenol A, diglycidyl ether of bisphenol F, diglycidyl ether of bisphenol B, diglycidyl ether of bisphenol C, diglycidyl ether of bisphenol E, diglycidyl ether of bisphenol AP, diglycidyl ether of bisphenol AF, diglycidyl ether of bisphenol BP, diglycidyl ether of bisphenol G, diglycidyl ether of bisphenol M, diglycidyl ether of bisphenol S, diglycidyl ether of bisphenol P, diglycidyl ether of bisphenol PH, diglycidyl ether of bisphenol TMC, diglycidyl ether of bisphenol Z, and combinations thereof.

In another embodiment, the adhesive composition includes a reaction product of a polyamine and a diacid, a diglycidyl ether, or a combination thereof; and one or more compounds selected from the group consisting of a branched aliphatic acid having C2-C26 alkyl group, a cyclic aliphatic acid with C7-C30 cyclic aliphatic group, a linear aliphatic acid having C2-C26 alkyl group, and combinations thereof. The reaction product of the a polyamine and a diacid, a diglycidyl ether forms an adduct.

The reaction product includes from about 10 wt. % to about 80 wt. %, such as from about 18 wt. % to about 50 wt. %, of the polyamine, and from about 20 wt. % to about 90 wt. %, such as from about 50 wt. % to about 82 wt. %, of the diacid, the diglycidyl ether, or a combination thereof based on the weight of the reaction product. The polyamine and the diacid, diglycidyl ether may also be provided to form the reaction mixture at a molar ratio of polyamine to the diacid, the diglycidyl ether, or a combination thereof of about 2:1 to about 1:2.

The composition may comprise from about 25 wt. % to about 96 wt. %, such as from about 45 wt. % to about 80 wt. %, of the reaction product and may comprise from about 4 wt. % to about 75 wt. %, such as from about 20 wt. % to about 55 wt. % of the one or more compounds selected from the group consisting of a branched aliphatic acid having C2-C26 alkyl group, a cyclic aliphatic acid with C7-C30 cyclic aliphatic group, a linear aliphatic acid having C2-C26 alkyl group, and combinations thereof.

The polyamine and the diglycidyl ether may also be provided to form the reaction mixture at a molar ratio of polyamine to the diacid, the diglycidyl ether, or a combination thereof of about 2:1 to about 1:2, with the one or more compounds selected from the group consisting of a branched aliphatic acid having C2-C26 alkyl group, a cyclic aliphatic acid with C7-C30 cyclic aliphatic group, a linear aliphatic acid having C2-C26 alkyl group, and combinations thereof being added to the composition at a molar ratio of polyamine to the diacid, the diglycidyl ether, or a combination thereof to the one or more compounds of about 2:2:1 to about 2:6:5. For example, an aliphatic acid-amine-diacid-amine-aliphatic acid structure, has a molar ratio of 2:2:1 ratio, and an aliphatic acid-(amine-diacid)5-amine-aliphatic acid has a structure with a molar ratio of 2:6:5 ratio.

The branched aliphatic acid having a C2-C26 alkyl group may be selected from the group consisting of neopentanoic acid, neononanoic acid, neodecanoic acid, neotridecanoic acid, and combinations thereof. Examples of such acids include Hexion's Versatic Acid™ 5, 9, 10, 913, and 1019 acids. The branched aliphatic acid having a C2-C26 alkyl group may comprise from about 9 wt. % to about 65 wt. %, such as from about 25 wt. % to about 50 wt. %, of the composition.

The cyclic aliphatic acid with C7-C30 cyclic aliphatic group may be selected from the group consisting of rosin, naphthenic acid, and combinations thereof. Examples of rosins include rosin acid, tall oil rosin, or gum rosin. All rosins are provided the CAS number 8050-09-7. The cyclic aliphatic acid with C7-C30 cyclic aliphatic group may comprise from about 20 wt. % to about 87 wt. %, such as from about 25 wt. % to about 65 wt. %, of the composition.

The linear aliphatic acid having C2-C26 alkyl group may be selected from the group consisting of unsaturated C2-C26 fatty acids, saturated C2-C26 fatty acids, and combinations thereof. Examples of unsaturated fatty acids include tall oil fatty acid, myristoleic acid, palmitoleic acid, sapienic acid, oleic acid, elaidic acid, vaccenic acid, linoleic acid, linoelaidic acid, alpha-linolenic acid, arachidonic acid, eicosapentaenoic acid, erucic acid, docosahexaenoic acid, and combinations thereof. Examples of saturated fatty acids include caprylic acid, capric acid, lauric acid, myristic acid, palmitic acid, stearic acid, arachidic acid, behenic acid, lignoceric acid, cerotic acid, and combinations thereof. The linear aliphatic acid having C2-C26 alkyl group may be any plant and animal fatty acid that are the combinations of above unsaturated and saturated fatty acids such as tall oil fatty acid, rosin acid, and fatty acids made from chicken fat, lard, beef tallow, canola oil, flaxseed oil, sunflower oil, corn oil, olive oil, sesame oil, peanut oil, cottonseed oil, palm oil, butter, and cocoa butter, palm kernel oil, coconut oil, and the alike. One example is tall oil fatty acids, and another example is rosin acid The linear aliphatic acid having C2-C26 alkyl group may comprise from about 20 wt. % to about 87 wt. %, such as from about 25 wt. % to about 65 wt. %, of the composition.

In one embodiment of the invention, the adhesive composition is made with the diacid comprising terephthalic acid, the polyamine comprising diethylenetriamine, and the linear aliphatic acid having C2-C26 alkyl group comprising tall oil fatty acid (TOFA). Such a composition is suitable for use as a dust control composition, among other uses.

In one embodiment of the invention, the adhesive composition is made with the diacid comprising terephthalic acid, the polyamine comprising diethylenetriamine, and the cyclic aliphatic acid with C7-C30 cyclic aliphatic group comprises rosin. Such a composition is suitable for use as a proppant flow-back control composition in fracturing process, among other uses.

In one embodiment of the invention, the adhesive composition is made with the diacid comprising terephthalic acid, the polyamine comprising diethylenetriamine, and the cyclic aliphatic acid with C7-C30 cyclic aliphatic group comprises rosin. Such a composition, when combined with a cross-link agent, is suitable for use as a proppant flow-back control and consolidating agent for proppant pack and gravel pack in fracturing process, among other uses.

In one embodiment of the invention, the adhesive composition is made with the diacid comprising terephthalic acid, the polyamine comprising diethylenetriamine, and the cyclic aliphatic acid with C7-C30 cyclic aliphatic group comprises rosin. Such a composition, when combined with a cross-link agent, is suitable for use as agents for consolidating downhole formation of the well in fracturing process, among other uses.

In another embodiment, a cross-linking agent may be added to the composition. The cross-link agents may include epoxy compounds.

In one embodiment, the cross-linking agent has the following general structure:

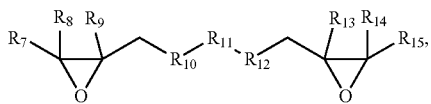

wherein R7, R8, R9, R13, R14, R15 are hydrogen atoms, C1-C20 aliphatic groups, aromatic groups, aromatic substituted aliphatic groups, or aliphatic aromatic groups, wherein R10 and R12 are oxygen atoms, sulfur atoms, or C1-C10 aliphatic groups, and wherein R11 is C1-C24 aliphatic, aromatic, aromatic substituted aliphatic, or aliphatic substituted aromatic groups.

In one embodiment, examples of suitable cross-link agents include a diglycidyl ether selected from the group consisting of diglycidyl ether of bisphenol A, diglycidyl ether of bisphenol F, diglycidyl ether of bisphenol B, diglycidyl ether of bisphenol C, diglycidyl ether of bisphenol E, diglycidyl ether of bisphenol AP, diglycidyl ether of bisphenol AF, diglycidyl ether of bisphenol BP, diglycidyl ether of bisphenol G, diglycidyl ether of bisphenol M, diglycidyl ether of bisphenol S, diglycidyl ether of bisphenol P, diglycidyl ether of bisphenol PH, diglycidyl ether of bisphenol TMC, diglycidyl ether of bisphenol Z, and combinations thereof. For example, diglycidyl bisphenol ether may be used as a cross-link agent for R-diamine-diacid-diamine-R type adhesives. In another example, the diglycidyl bisphenol ether also can be used to form R-diamine-diglycidyl bisphenol ether-diamine-R type adhesive.

In one embodiment, the adhesive composition comprises a formula selected from the group of:

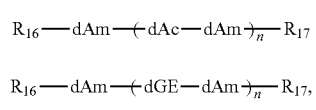

(Structure 1)

(Structure 2)

or a mixture thereof, wherein n is 0 to 10, R16 and R17 are each independently selected from the group of a branched aliphatic acid having C2-C26 alkyl group, cyclic aliphatic acid with C7-C30 cyclic aliphatic group, a linear aliphatic acid having C2-C26 alkyl group, or a combination thereof, the dAm comprises a polyamine, such a diamine described herein, dAc comprises a diacid as described herein, and dGe comprises a diglycidyl ether as described herein.

In another embodiment, the diacid comprises terephthalic acid, the polyamine comprises diethylenetriamine, and the reaction product comprises:

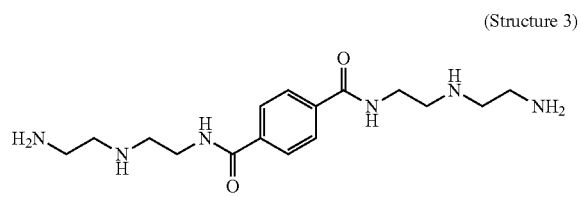 [SMILES: NCCNCCNC(=O)c1ccc(C(=O)NCCNCCN)cc1]

(Structure 3)

The reaction product is then reacted with (a branched aliphatic acid having C2-C26 alkyl group) versatic acid, (the cyclic aliphatic acid with C7-C30 cyclic aliphatic group) rosin (Rosin), (the linear aliphatic acid having C2-C26 alkyl group) tall oil fatty acid (TOFA), or a combination thereof and the composition comprises:

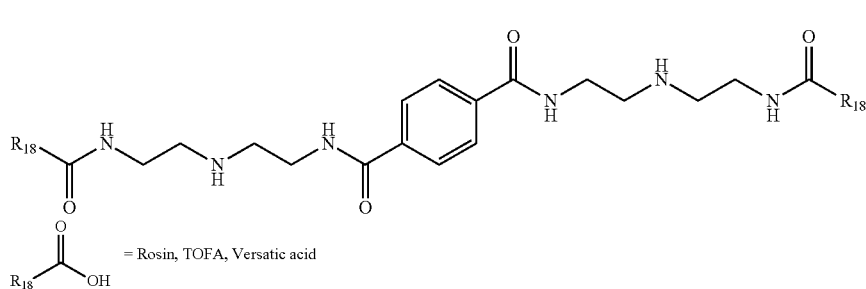

(Structure 4)

For structure 4, for example, if the rosin is used, R18 may be $C_{19}H_{29}$, if a versatic acid is used, R18 may be $C_9H_{19}$, and if TOFA is used, R18 may be $C_{17}H_{33}$.

In another embodiment, the adhesive composition includes a reaction product from concurrently reacting components a)-c) which are a) a polyamine, b) a diacid, a diglycidyl ether, or a combination thereof and c) one or more compounds selected from the group consisting of a branched aliphatic acid having C2-C26 alkyl group, a cyclic aliphatic acid with C7-C30 cyclic aliphatic group, a linear aliphatic acid having C2-C26 alkyl group, and combinations thereof. The reaction product of a), b), and c) forms composition.

In another embodiment, the adhesive composition comprises a formula selected from the group of:

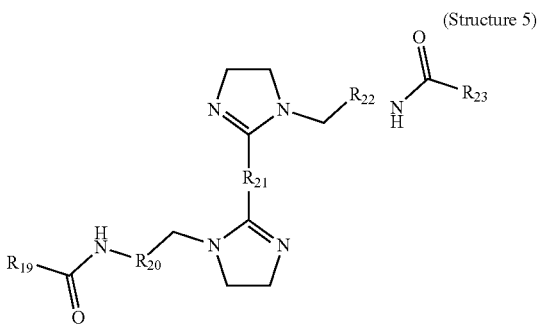

(Structure 5)

Wherein R21 is the central organic segment of a diacid ($HO_2C—R'—CO_2H$) as described herein. R19 and R23 are each independently selected from the group of a branched aliphatic acid having C2-C26 alkyl group, cyclic aliphatic acid with C7-C30 cyclic aliphatic group, a linear aliphatic acid having C2-C26 alkyl group, or a combination thereof.

R20 and R22 are alkyl, or alkylamino groups such as —(CH$_2$—)$_n$—, or —(CH$_2$CH$_2$NH)—, or combination thereof and n is from 0 to 10. Structure 5 is a bis-imidazoline component. Structure 5 is derived from a diacid (HO$_2$C—R'—CO$_2$H) as described herein with R' being the organic segment to which the carboxylic acid groups are attached.

In another embodiment, the adhesive composition comprises a formula selected from the group of:

and combinations thereof, wherein R24 and R25 are each independently H, or C1 to C24 carbon aliphatic group, an aromatic substituted aliphatic group, or a combination thereof, and R26 comprise CH comprises CH2, or (CH2CH2NH),CH2 with n=1-3.

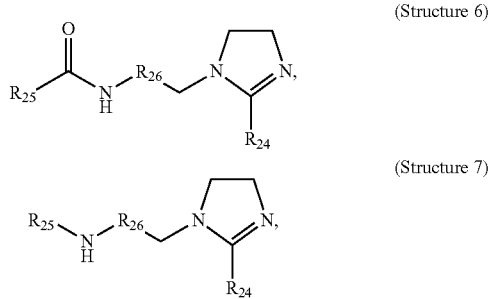

(Structure 6)

(Structure 7)

The composition described herein for Structures 1, 2, 4, and 5 can further be modified by grafting the backbone through oxyalkylation of the secondary amine, or reacting the secondary amine with ethylene oxide, propylene oxide or butylene oxide in any ratio, or sequences, or molar mass.

The composition described herein for Structures 1, 2, 4, and 5 can further be modified by reacting the secondary amine with epoxides. Suitable epoxides include an alkylglycidyl ether, such as butylglycidyl ether, p-tert-butyl phenyl glycidyl ether, cresyl glycidyl ether, Castor oil glycidyl ether, glycidyl ester of neodecanoic acid, and combinations thereof.

The composition described herein for Structures 1, 2, 4, and 5 can further be modified by grafting the main chain through amidation of the secondary amine, or through the esterification of the hydroxyl with carboxylic acids if there are hydroxyl groups available for reaction. Suitable carboxylic acids include any carboxylic acids described herein including, for example, tall oil fatty acid, tallow fatty acid, neoalkanoic acid (such as Hexion's Versatic™ acid described herein), and combinations thereof.

The composition described herein for Structures 1, 2, 4, and 5 can further be modified by quaternizing the secondary amine. Suitable compounds for quaternizing the secondary amine include, but not limited to, benzyl chloride, acrylic acid, and combinations thereof The composition described herein for Structures 1, 2, 4, and 5 can further be reacted by oxidizing the secondary amine to an amine oxide.

In one embodiment, a composition is provided including a first resin, a second resin, and a cross-linking agent. The second resin is different than the first resin. The first and second resin may be any of the resins described herein.

In another embodiment, a composition is provided including a first resin comprising a first reaction product of a first diglycidyl ether or a first polyacid selected from the group consisting of an aromatic polyacid, an aliphatic polyacid, an aliphatic polyacid with an aromatic group, and combinations thereof and first polyamine, and one or more compounds selected from the group consisting of a branched aliphatic acid having C2-C26 alkyl group, a cyclic aliphatic acid with C7-C30 cyclic aliphatic group, a linear aliphatic acid having C2-C26 alkyl group, and combinations thereof; and a second resin comprising a second reaction product of a second diglycidyl ether or a second polyacid selected from the group consisting of an aromatic polyacid, an aliphatic polyacid, an aliphatic polyacid with an aromatic group, and combinations thereof, and a second polyamine, and one or more compounds selected from the group consisting of a branched aliphatic acid having C2-C26 alkyl group, a cyclic aliphatic acid with C7-C30 cyclic aliphatic group, a linear aliphatic acid having C2-C26 alkyl group, and combinations thereof; and a cross-linking agent.

In one embodiment, a composition is provided comprising a first resin comprising a first reaction product of a first diglycidyl ether or a first polyacid selected from the group consisting of an aromatic polyacid, an aliphatic polyacid, an aliphatic polyacid with an aromatic group, and combinations thereof and a first polyamine, and a cyclic aliphatic acid with a C7-C30 cyclic aliphatic group; and a second resin comprising a second reaction product of a second diglycidyl ether or a second polyacid selected from the group consisting of an aromatic polyacid, an aliphatic polyacid, an aliphatic polyacid with an aromatic group, and combinations thereof and a second polyamine, and one or more first compounds selected from the group consisting of a branched aliphatic acid having C2-C26 alkyl group, a linear aliphatic acid having C2-C26 alkyl group, and combinations thereof; and a cross-linking agent.

In one embodiment, a composition is provided comprising a first resin comprising a first reaction product of a first diglycidyl ether or a first polyacid selected from the group consisting of an aromatic polyacid, an aliphatic polyacid, an aliphatic polyacid with an aromatic group, and combinations thereof and a first polyamine, and a cyclic aliphatic acid with a C7-C30 cyclic aliphatic group; and a second resin comprising a second reaction product of a second diglycidyl ether or a second polyacid selected from the group consisting of an aromatic polyacid, an aliphatic polyacid, an aliphatic polyacid with an aromatic group, and combinations thereof and a second polyamine, and one or more first compounds selected from the group consisting of a branched aliphatic acid having C2-C26 alkyl group, a linear aliphatic acid having C2-C26 alkyl group, and combinations thereof; and a cross-linking agent.

In another embodiment a composition is provided including three or more resins, wherein each resin is different than the other resins. Any of the resin may be any of the resins described herein.

In another embodiment a composition is provided including a first resin, a second resin, a third resin, and a cross-linking agent. Each of the first resin, the second resin, and the third resin are different than the other two resins. The first resin, second resin, and third resin may be any of the resins described herein.

The composition of first resin, second resin, and cross-linking agent may include:

from about 15 wt. % to about 65 wt. %, such as from about 22 wt. % to about 27 wt. % of the first resin, from about 10 wt. % to about 45 wt. %, such as from about 15 wt. % to about 25 wt. % of the second resin, and from about 5 wt. % to about 75 wt. %, such as from about 25 wt. % to about 63 wt. % of the cross-linking agent, wherein the total weight percent is 100 wt %.

In one embodiment of the first resin, the first resin is made from the formulation comprising from about 30 wt. % to about 60 wt. % of the first reaction product, wherein the first reaction product comprises from about 15 wt. % to about 85 wt. % of the first diglycidyl ether or the first polyacid and from about 15 wt. % to about 85 wt. % of the first polyamine; and from about 40 wt. % to about 70 wt. % of one or more first compounds selected from the group consisting of a branched aliphatic acid having C2-C26 alkyl group, a cyclic aliphatic acid with C7-C30 cyclic aliphatic group, a linear aliphatic acid having C2-C26 alkyl group, and combinations thereof.

In one embodiment of the second resin, the second resin is made from the formulation comprising from about 30 wt. % to about 60 wt. % of the second reaction product, wherein the second reaction product comprises from about 15 wt. % to about 85 wt. % of the second diglycidyl ether or the second polyacid and from about 15 wt. % to about 85 wt. % of the second polyamine; and from about 40 wt. % to about 70 wt. % of one or more second compounds selected from the group consisting of a branched aliphatic acid having C2-C26 alkyl group, a cyclic aliphatic acid with C7-C30 cyclic aliphatic group, a linear aliphatic acid having C2-C26 alkyl group, and combinations thereof.

The cured products of the composition of first resin, second resin, and cross-linking agent have been observed to stay thermally stable up to 205° C. (400° F.). The composition may be used in broad temperature range from 60° C. to 191° C. (140° F. to 375° F.).

When coated to a 40/70 mesh sand at 1.0% dosing level, the cured products of the composition of first resin, second resin, and cross-linking agent have been observed to have an UCS value from about 150 psi to about 500 psi, such as from about 200 (psi) to about 400 psi.

In an embodiment of the composition having a first resin, second resin, a third resin, and a cross-linking agent may include:

from about 15 wt. % to about 65 wt. %, such as from about 22 wt. % to about 27 wt. % of the first resin, from about 10 wt. % to about 45 wt. %, such as from about 15 wt. % to about 25 wt. % of the second resin, from about 5 wt. % to about 20 wt. %, such as from about 8 wt. % to about 15 wt. % of the third resin, and from about 5 wt. % to about 70 wt. %, such as from about 25 wt. % to about 55 wt. % of the cross-linking agent, wherein the total weight percent is 100 wt %.

In one embodiment of a resin, the resin may be formed from a polyamine as described herein and one or more compounds selected from the group consisting of a branched aliphatic acid having C2-C26 alkyl group, a cyclic aliphatic acid with C7-C30 cyclic aliphatic group, a linear aliphatic acid having C2-C26 alkyl group, and combinations thereof.

In one embodiment of the third resin, the third resin is made from a formulation comprising a third reaction product comprising from about 15 wt. % to about 85 wt. % of one or more third compounds selected from the group consisting of a branched aliphatic acid having C2-C26 alkyl group, a cyclic aliphatic acid with C7-C30 cyclic aliphatic group, a linear aliphatic acid having C2-C26 alkyl group, and combinations thereof and from about 15 wt. % to about 85 wt. % of a (third) polyamine.

The third resin may be an imidazoline. One example of the third resin has the following structure:

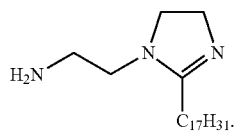

An example of the third resin is Evcaor 703, commercially available from Ingevity, Inc.

The adhesive composition may further comprise a solvent. Suitable solvents include a solvent selected from the group consisting of aromatic solvents, ethers, alcohols, water, and combinations thereof. Examples of aromatic solvents include toluene, xylenes, naphthas, and combinations thereof. Examples of suitable naphtha solvents are heavy aromatic naphtha solvents such as Aromatic 100, Aromatic 150, and Aromatic 200, commercially available from ExxonMobil Inc. Examples of ethers include diglyme, triglyme, polyglyme, proglyme (BASF), ethylene glycol butyl ether (EGBE), tripropyleneglycol methyl ether, ethyleneglycol butyl ether, dipropylene glycol ethyl ether, tripropylene glycol ethyl ether, diethylene glycol ethyl ether, diethyleneglycol butyl ether, and combinations thereof. Examples of alcohols include methanol, isopropanol, ethanol, propanol, butanol, ethoxytriglycol, methoxytriglycol, 2,2-dimethyl-4-hydroxymethyl-1,3-dioxolane (Solvay SL 191), and combinations thereof.

The solvent system or solvent mixture is designed to allow transport and delivery of the coating material at the individual interfaces between the individual sand grains. These solvent combinations are also designed to allow good solubility and good wetting of the sand surface. The solvent system is designed to have a water soluble component or components that assist transport and delivery of the coating material in the slurry, but diffuse into the aqueous matrix after coating to allow a viscous, adhesive coating on the sand surface. The subsequent diffusion of the oil soluble component or components from the coating layer into the oil matrix ensures a rigid adhesive bond between the sand grains and consequently the formation of a solid core.

The adhesive compositions herein may function as a pressure sensitive adhesive when the composition is in a (high viscosity) liquid state or semi-liquid state. In one embodiment, the composition may further include solvents, plasticizers, wetting agents, polymers, and combinations thereof.

The adhesive composition described herein may be used for coating a proppant, used for adhesive applications, such as a tackifier for hot-melt adhesive applications, or pressure sensitive adhesive, used for paints and other large surface coatings. Additionally, the adhesive coating may are used for dust suppression, such as in agricultural, coal, stone (gravel dust), cement, concrete, and road applications, among others. In fracturing processes, the adhesive composition may be used for proppant flow-back control, the consolidation of proppant packs, and consolidation of formations, among other uses.

In one embodiment a process for forming an adhesive composition includes reacting a diacid and a polyamine to form a reaction mixture, and then adding one or more compounds selected from the group consisting of a branched aliphatic acid having C2-C26 alkyl group, a cyclic aliphatic acid with C7-C30 cyclic aliphatic group, a linear aliphatic acid having C2-C26 alkyl group, and combinations thereof, to form the adhesive composition.

In one embodiment of the process, the adhesive composition may be created as follows. A diacid and a polyamine are added together in a reactor at a first temperature and then heated to a second temperature. The reaction was continued at the second temperature for a first period of time until no water was further releases and the reaction product was formed. Optionally, a nitrogen purge may be performed during the first period of time. Then the one or more compounds selected from the group consisting of a branched aliphatic acid having C2-C26 alkyl group, a cyclic aliphatic acid with C7-C30 cyclic aliphatic group, a linear aliphatic acid having C2-C26 alkyl group, and combinations thereof, to form the adhesive composition, were added to the reactor and the reaction was continued at the second temperature for a second period of time. The one or more compounds may be added dropwise. Optionally, a nitrogen purge may be performed during the second period of time. The reaction temperature was increased to a third temperature for a third period of time. After the third period of time, the composition was cool to a fourth temperature, and transferred to a receptacle, which was maintained at a fifth temperature.

The first temperature was from about 100° C. to about 185° C., for example, from about 145° C. to about 180° C. The second temperature was from about 180° C. to about 220° C., for example, from about 190° C. to about 215° C. The first period of time was from about 30 minutes to about 5 hours, for example about 1.5 hours. The second period of time was from about 30 minutes to about 5 hours, for example about 1 hour. The third temperature was from about 210° C. to about 260° C., for example, about 250° C. The third period of time was from about 20 minutes to about 3 hours, for example about 30 minutes. The fourth temperature was from about 260° C. to about 140° C., for example, about 150° C. The fourth temperature was from about 150° C. to about 110° C., for example, about 120° C.

In one embodiment a process for forming the third resin includes reacting a fatty acid and a polyamine to form an imidazoline.

In one embodiment of the process, the third resin may be created as follows. A fatty acid and a polyamine are added together in a reactor at a first temperature and then heated to a second temperature. The reaction was continued at the second temperature for a first period of time until no water was further releases and the reaction product was formed. After the first period of time, the composition was cool to a third temperature, and transferred to a receptacle, which was maintained at a fourth temperature.

The first temperature was from about 100° C. to about 185° C., for example, from about 145° C. to about 180° C. The second temperature was from about 180° C. to about 275° C., for example, from about 190° C. to about 270° C. The first period of time was from about 30 minutes to about 5 hours, for example about 1.5 hours. The second period of time was from about 30 minutes to about 5 hours, for example about 4 hour. The third temperature was from about 100 to about 60° C., for example, about 60° C. The third period of time was from about 20 minutes to about 3 hours, for example about 30 minutes. The fourth temperature was from about 60° C. to about 10° C., for example, about 20° C.

For a composition having a first resin, a second resin, and a cross-linking agent, the resins with or without the cross-linking agent can be pre-mixed. One method to apply the chemicals is to pump the resins into an inline static mixer, which mixes the resins and discharges the mixed liquid to the blend tub. The mixed resin coats the proppants in the blending tube, and the coated proppants are then pumped to downhole formation to perform the flowback control function. Another way to apply the resins of this invention is to premix the resins on site, or in a facilitate just before hydraulic fracturing operation.

In one embodiment, the particle material may be a proppant material formed by coating a substrate material as described herein with the adhesive composition described herein.

Proppant materials, or proppants, are generally used to increase production of oil and/or gas by providing a conductive channel in the formation. Fracturing of the subterranean formation is conducted to increase oil and/or gas production. Fracturing is caused by injecting a viscous fracturing fluid or a foam at a high pressure (hereinafter injection pressure) into the well to create a fracture. A similar effect can be achieved by pumping a thin fluid (water containing a low concentration of polymer) at a high injection rate.

As the fracture is formed, a particulate material, referred to as a "proppant" is placed in the formation to maintain the fracture in a propped condition when the injection pressure is released. As the fracture forms, the proppants are carried into the fracture by suspending them in additional fluid or foam to fill the fracture with a slurry of proppant in the fluid or foam, often referred to as a fracturing fluid or fracking fluid. Upon release of the pressure, the proppants form a pack that serves to hold open the fractures. The propped fracture thus provides a highly conductive channel in the formation. The degree of stimulation afforded by the hydraulic fracture treatment is largely dependent upon formation parameters, the fracture's permeability, the propped fracture length, propped fracture height and the fracture's propped width.

Gravel packing treatments are used to reduce the migration of unconsolidated formation sands/fines into the well bore. In gravel packing operations, the proppant materials described herein are suspended in a carrier fluid and are pumped into a well bore in which the gravel pack is to be placed. The carrier fluid leaks off into the subterranean zone and/or is returned to the surface while the proppant materials are left in the annulus between the production string and the casing or outside the casing in the subterranean zone adjacent to the wellbore.

Gravel pack operations generally involve placing a gravel pack screen in the well bore and packing the surrounding annulus between the screen and the well bore with the particles. The gravel pack screen is generally a type of filter assembly used to support and retain the proppant materials plated during the gravel pack operation. A wide range of sizes and screen configurations are available to suit the characteristics of a particular well bore, the production fluid, and the subterranean formation sands. Such gravel packs may be used to stabilize the formation while causing minimal impairment to well productivity. The gravel pack acts as a filter to separate formation sands from produced fluids while permitting the produced oil and/or gas to flow into the well bore. The proppant materials act to prevent formation sands from plugging the screen or migrating with the produced fluids, and the screen acts to prevent fines from being produced to the surface and out of the well.

In some situations, the processes of hydraulic fracturing and gravel packing are combined into a single treatment to provide stimulated production and an annular gravel pack to reduce formation sand production. Such treatments are often referred to as "frac pack" operations. In some cases, the treatments are completed with a gravel pack screen assembly in place, and the hydraulic fracturing treatment being pumped through the annular space between the casing and screen. In such a situation, the hydraulic fracturing treatment usually ends in a screen out condition creating an annular gravel pack between the screen and casing. This allows both the hydraulic fracturing treatment and gravel pack to be placed in a single operation.

In one embodiment, the particle material may be a proppant formed by coating a substrate material as described herein with the adhesive composition described herein. The deposited coating may be continuous or non-continuous. If continuous, the coating may be deposited at a thickness from about 0.001 microns to about 10 microns. The proppant material may be pre-cured or curable.

In one embodiment, of the proppant material, the coating of the adhesive composition may comprise from about 0.05% to about 10% by weight, such as from about 0.5% to about 4% by weight, for example, from about 0.8% to about 2% by weight, of the proppant material; and the substrate material comprises from about 90% to about 99.95% by weight, such as from about 95% to about 99.9% by weight, for example, from about 98% to about 99.8% by weight, of the proppant material.

The process to form the proppant material may be a batch process, a semi-continuous process, or a continuous process. The process to form the proppant material may be performed remotely at a manufacturing facility or may be manufactured at point of use, such as using a device described in United States Patent Publication US2015/0360188, which is incorporated herein by reference in its entirety not inconsistent with the description herein.

In one embodiment of the proppant formation process, a substrate material, such as sand, introduced into a mixing device. The substrate material may be heated before or after addition to a mixing device. The substrate material is heated to a temperature from about 20° C. to about 50° C., for example, about 21° C. Next the adhesive composition, and any additives, such as a coupling agent or cross-linking agent, are added while mixing. After coating for a period of time, such as from about 1 minute to about 1 hour, for example about 4.25 minutes, the batch is cooled through the addition of water and mixing continued to obtain free-flowing particles of coated proppant. The coated particles (proppant material) are discharged from the mixer and passed through a screen and the desired particle sizes of proppant are recovered. The particles are agitated during curing.

In another embodiment of the proppant formation process, the proppant may be a formed by a real-time coating or point-of-use manufacturing process, such as at a well site. In such a process, a substrate material, such as sand, is introduced into a mixing device. Next the adhesive composition, and any additives, such as a coupling agent or cross-linking agent, are added while mixing. After a coating period of time, such as from about 1 minutes to about 1 hours, for example about 4.25 minutes, the coated substrate will be directly delivered to the fracturing fluid, and pumped together to the down-hole formation.

The mixing can take place in a device that uses shear force, extensional force, compressive force, ultrasonic energy, electromagnetic energy, thermal energy or a combination comprising at least one of the foregoing forces and energies. The mixing is conducted in processing equipment wherein the aforementioned forces are exerted by a single screw, multiple screws, intermeshing co-rotating or counter rotating screws, non-intermeshing co-rotating or counter rotating screws, reciprocating screws, screws with pins, barrels with pins, screen packs, rolls, rams, helical rotors, or a combination comprising at least one of the foregoing. Exemplary mixing devices are EIRICH™ mixer, WARING™ blenders, HENSCHEL™ mixers, BARBER GREEN™ batch mixers, ribbon blenders, or the like.

In an embodiment of a proppant production process, substrate material is coated in a continuous system. Substrate material enters an elongated (for example, 20 foot long) horizontal mixer containing two horizontally mounted shafts having paddles to promote mixing the ingredients and moving them horizontally along the mixer. If employed, any additives, such as a coupling agent or cross-linking agent, are immediately added, and then the adhesive composition as described herein is added. This mixture travels down the mixer. The total time in the mixer can range from about 3-10 minutes depending on desired throughput rate.

In one embodiment of a continuous coating system in which substrate material and coating material are fed to the long horizontal oriented mixer that may be of varying length and diameter. The embodiment of the continuous coating system has from two to four horizontal shafts that run the length of the mixer. Along the shaft there are positioned multiple sets of mixing paddles mounted on the shaft. The paddles are oriented so as to insure both mixing and the transport of the substrate from the beginning of the mixer to its exit point. At various points along the mixer are positioned addition ports so chemicals may be added at prescribed rates and times. For example, there may be addition ports for additives and surface wettability modifiers as described herein.

The proppant materials, as described in this invention may be injected into the subterranean formation as the sole proppant in a 100% proppant pack (in the hydraulic fracture) or as a part replacement of existing commercial available ceramic and/or sand-based proppants, polymeric material-coated and/or uncoated, or as blends between those, for example, coated particles, are 5 to 50 weight % proppant materials as described herein of the total proppants injected into the well. For example, the uncoated proppant materials may be first placed in a well, and afterwards a proppant material as described herein may be placed in the fracture that is closest to the wellbore or fracture openings. This type of fracturing treatment is done without stopping to change the proppant and is known in the industry as a "tail-in treatment".

In a further embodiment, proppant materials as described herein in the 70/140 mesh range, sometimes referred to as fluid loss additives, are provided as a part replacement of existing commercial available ceramic and/or sand-based proppants, polymeric material-coated and/or uncoated, or as blends between those, are 3 to 50 weight % proppant materials as described herein of the total proppants. Such 70/140 mesh proppant materials described herein would be placed first, typically as part of a pad. This portion of the coated proppant is typically pumped in slugs in the pad.

In another embodiment, an additive composition comprising the adhesive composition described herein may be directly added to a fracturing fluid (also referred to as fracking fluid or carrier fluids). Generally, fracturing fluids are well known in the art of examples of materials comprising fracturing fluids include water and optionally, one or more of a gelling agent, a friction reducer, an acid, a surfactant, a crosslinker, a biocide, a scale inhibitor, a non-emulsifier, a breaker, a proppant and combinations thereof. The additive composition described herein may be present in an amount in the range of from about 0.01 weight percent to about 10 weight percent, such as from about 0.1 weight percent to about 3 weight percent, for example from 0.25 weight percent to 1.5 weight percent, based on the total weight of the fracturing fluid.

The fracturing fluid may further include proppants, such as proppants made with the adhesive composition described herein, which comprise from about 1 weight percent to about 50 weight percent, such as from about 5 weight percent to about 40 weight percent, based on the total weight of the fracturing fluid.

In operation, the fracturing fluid composition described herein is introduced into a subterranean formation, such as by pumping or gravity deposition, and which introduction is referred to one skilled in the art as "injecting" (or "pumping") a fracturing fluid composition into a subterranean formation. In one embodiment, the injecting process includes introducing the fracturing fluid composition via pre-positioned perforations in specific locations and spacing along the wellbore.

In an embodiment including a proppant, such as the proppants described herein, the fracturing fluid composition injection process comprises suspending the proppants in a fracturing fluid (often referred to as a carrier fluid) to form a suspension and injecting the suspension into a subterranean formation.

In practice, the suspension is injected into a subterranean formation at high rate and high pressure, which in turn results in creating a network of fractures into the formation. The fractures are prevented from closing by the suspended proppant. The suspended proppant, such as proppants described herein, form a high permeability pathway or conduit to extract hydrocarbon fluid out of the very low permeability shale or rock formation, once the fracturing pressure is relieved and the formation starts to produce.

For dust control, the adhesive composition described herein may be applied to suppress dust on substrates, which may also be referred herein to as dust source substrate. The composition may be disposed on the substrate, and may be applied to be continuously or semi-continuously disposed on the dust source substrate. The composition may be applied on one or more substrates, as described herein above as organic or inorganic particulate material comprising the dust source substrate, such as for coal contained in a coal car. Suitable dust source substrates to which the composition can be applied include coal (and coal dust), mined materials including ores and minerals, surface mining operations, roads and road surfaces including unimproved roads and surfaces (for example "dirt roads"), mining or manufacturing waste dumps, harvested and non-harvested agricultural crops, fields, charcoal, sand mines, sand transloads, proppant transloads, sand storage, proppant storage, earth moving operations, cement mixing, open railcar loads, open truck loads, environmental remediation, quarries, mining waste, wind erosion protection, agriculture product control (crop seeds dust control), and soil stabilization, and combinations thereof, among others. For example, in one embodiment, the compositions may be applied to a substrate of coal as a coal dust suppressant. The composition described herein may also be used as a topical spray on automobiles as a proactive coating for shipment.

The adhesive composition described herein may be applied to a dust producing substrate or substrates, such as coal which produces coal dust. The composition may be applied to the exposed surfaces, such as a top surface, of the substrate, such as coal, by applying the compositions described herein by a spraying technique, a misting technique, a poring technique, mixing technique, blending technique or combinations thereof, to the exposed surfaces of the substrate. The composition or emulsions described herein are applied to provide sufficient dust suppression. The composition described herein may be diluted or emulsified prior to application to a substrate or used with a solvent, and may be combined with water or solvent. In one embodiment, the composition may be applied to provide for dust control at an amount of 0.001 to 10 wt. % of the weight of the substrates.

EXAMPLES

Aspects and advantages of the embodiments described herein are further illustrated by the following examples. The particular materials and amounts thereof, as well as other conditions and details, recited in these examples should not be used to limit the embodiments described herein. All parts and percentages are by weight unless otherwise indicated.

Example 1: Typical Synthesis Procedure of the Adhesives

To a four-neck flask was charged diethylenetriamine (DETA, 51.5 g, 0.5 mol). The flask was heated up to 145° C. Terephthalic acid (TPA, 41.5 g, 0.25 mol) was charged portion wise so no clumping occurs, while allowing the heating continue. The temperature was controlled between 145° C. to 180° C. After the addition was complete, and TPA was completely dissolved, the reaction was heated up to 190-215° C., and held at this temperature for 1.5 h, or until no water was further released. Nitrogen purge was used to drive the reaction to complete. To the flask was added tall oil fatty acid (TOFA) (L-5 from Ingevity, 148 g, 0.5 mol) drop wise, and the reaction continued. The addition took about 1 h. After the addition was complete, the reaction was held at 190° C. to 215° C. for 1 h. Nitrogen purge was used to drive the generated water out. The reaction was then heated up to 250° C., and held for 30 min. The reaction was then cooled down to 150° C., and the liquid brown product was transferred to a glass jar.

Example 2: Flow-Back Control Coating-Stickiness Evaluation

A new test method was developed to evaluate the degree of adhesion (tackiness) that the chemicals of this invention introduce to the surface of the individual sand grains when they are coated with the chemicals. The equipment of this new method was designed and constructed that the viscosity of the slurry can be measured at various temperatures between 0° C. and 95° C., using a circulated water bath with accurate temperature control. The coating procedure is as the following.

Sample 1, made by the process of Example 1 except using rosin in place of the tall oil fatty acid to form the final product, was dissolved in a solvent comprising of 25% heavy aromatic naphtha and 75% dipropyleneglycol ether to generate a viscous liquid with 50% active ingredient. 1 g of the liquid sample was added to 100 g of sand in a 200 ml glass jar, and the resulting mixture was mixed with spatula manually for 5 min, or until the chemical was evenly coated on the sand surface. Next, 100 ml of tap water was added to the jar, and the resulting slurry was stirred with a spatula manually for 20 seconds, and the water was decanted. The last step was repeated once. Then, 60 ml of tap water were added to the jar.

The increase in viscosity of the slurry, as result of the chemical addition is used as an indication of the degree of adhesion (stickiness) between the sand grains. The viscosity of the slurry was measured with a Brookfield viscometer, equipped with T-bar spindles, which was immersed in the slurry during the measurement.

From FIG. 1 (FIG. 1), sand coated with the adhesive of this invention has significantly higher viscosity at all rotational rates, especially at the 5 and 10 RPM.

Figure 2:
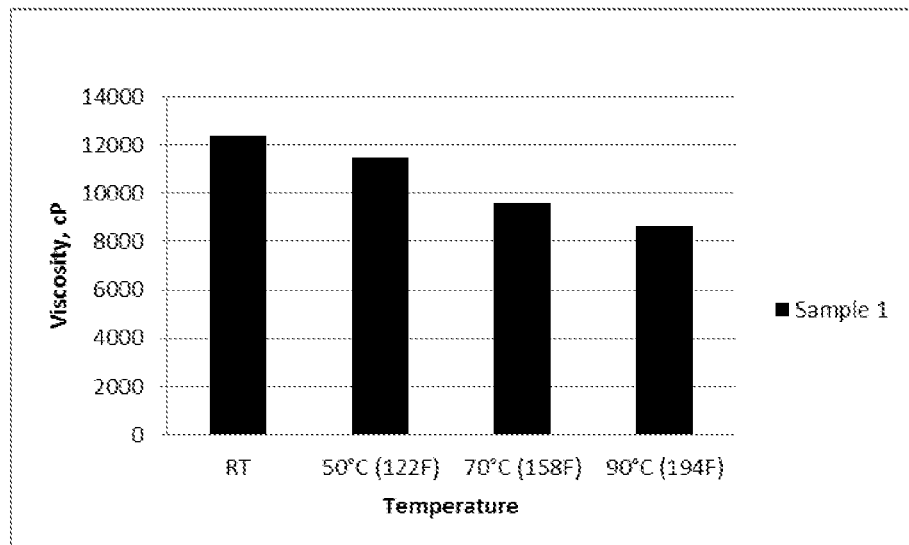
FIG. 2 is a graph showing the viscosity of sand slurry coated with Sample 1 of this invention at different temperature control.

A major challenge in fracturing operation that uses the real-time coating method is that the high stickiness of the coating layer causes clogging of equipment and wellbore. In order to reduce the clogging, an ideal coating layer should have low stickiness at ambient temperature when coated sand is pumped to down-hole formation, while having or maintaining good stickiness after depositing in the down-hole fractures which normally has high temperature and high pressure (HPHT or HTHP). From FIG. 2 (FIG. 2), Sample 1 provides a good temperature profile appreciable to one of ordinary skilled in the art. At ambient temperature when the coated sand is pumped, Sample 1 has a relatively low viscosity, and at high temperature that corresponds to the down-hole condition, the viscosity remains stable to one of ordinary skilled in the art.

Example 3: Flow-Back Control Coating—Evaluation of Unconfined Compressive Strength of Non-Cross-Linked Resin Unconfined Compressive Strength—General Loading and Testing Procedure.

The terms "cured" and "curable" may be defined for the present specification by the bond strength of the surface material. In one embodiment described herein, curable is any surface material having a UCS Bond Strength of 1 psi or greater and/or capable of forming a core.

Compressive strength of curable proppants is defined as that measured according to the following procedure, known as the Unconfined Compressive Strength or UCS test. In this test, proppant is added to a 2 weight percent KCl solution doped with a small amount of detergent to enhance wettability. The KCl solution and proppant, such as from about 6 to about 18 lbs., typically about 12 lbs. proppant per gallon KCl, are gently agitated to wet the proppant. Remove entrained air bubbles, if any. If necessary use a wetting agent to remove the bubbles. This slurry from about 100 to about 200 grams depending on density) is transferred into duplicate 1.25 inch outside diameter, 10 inch stainless steel cylinders, equipped with valves on the top and bottom to bleed liquid and gas pressure as required, a pressure gauge reading 0 to 2000 psi, and a floating piston to transfer pressure to the sample. Typically at least 2, preferably at least 3 specimen molds are loaded to give a length greater than two times the diameter of the finished slug. The bottom valve is opened during the application of stress, allowing fluid to drain from the slurry, and then closed during the application of temperature. The cylinder is connected to a nitrogen cylinder and 1000 psi is imposed on the cylinder, transmitted by the sliding pistons to the sample, and then top valve is shut and bottom valve remains open.

As test temperature is approached near to the fluid valve on the mold, the bottom valve (fluid valve) is closed. Closing the fluid valve too soon may generate enough pressure, as the cell is heating, to prevent/reduce the intended closure stress applied to the proppant slug. Closing the valve too late may allow loss of too much fluid from the slug by evaporation or boiling. The duplicate cylinders containing the sample are transferred to an oven preheated to the desired setpoint, for example, 200° F., and remain in the oven for 24 hours. Maintain stress and temperature during the cure time. Stress should be maintained +−10%. During the curing process in the oven, loose curable proppant particles become a consolidated mass. At the end of the 24 hours, the cylinders are removed, venting off pressure and fluid rapidly, and the approximately one inch by six inch consolidated slug sample is pressed from the cylinder. The sample is allowed to cool and air dry for about 24 hours, and cut (typically sawed) into compression slugs of length times diameter (L×D) of greater than 2:1, preferably about 2.5:1. Air drying is performed at a temperature of less than about 49° C. (120° F.). Typically, both ends of each slug are smoothed to give flat parallel surfaces and the slugs are cut to maintain a greater than 2:1 ratio of the length:diameter.

The compression slugs are mounted in a hydraulic press and force is applied between parallel platens at a rate of about 4000 lbs$_f$/minute until the slug breaks. For slugs with compressive strength less than 500 psi, use a loading rate of about 1000 lbs$_f$/minute. The force required to break the slug is recorded, replicates are documented, and the compressive strength for each sample is calculated using the formula below. An average of the replicates is used to define the value for this resin coated proppant sample. The formula for calculation is $Fc=(4*Fg)/((p*d^2)*(0.88+(0.24d/h)))$ with Fc=compressive strength (psi), Fg=hydraulic gauge reading (lb force), p=pi (3.14), d=diameter of the slug (inches), and h=length of slug (inches).

Compressive strength of the slugs is determined using a hydraulic press, such as a Carver Hydraulic Press, model #3912, Wabash, Ind. Typical compressive strengths of proppants of the present invention range from about 10 to about 100 psi or higher. However, the reproducibility of the UCS test is probably +/−10% at best. It is also noted that the Compressive Strength Test can be used to indicate if a coating is cured or curable. No bonding, or no consolidation of the coated particles, following wet compression at 1000 psi at 200° F. for a period of as much as 24 hours, indicates a cured material.

The molded specimens made according to this procedure are suitable for measurement of Brazilian tensile, strength and/or unconfined compressive strength (UCS) test of ASTM D 2938-91 or ASTM D 2938-95 Standard Test Method for Unconfined Compressive Strength of Intact Rock Core Specimens. For compressive strength measurements, the test specimen shall be cut to a length of at least 2.25 inches (57.2 mm), a length to diameter ratio of at least 2 to 1, and then broken according to ASTM D 2938-91 Standard Test Method for Unconfined Compressive Strength of Intact Rock Core Specimens. For Brazilian tensile strength measurements, the test specimen shall be cut to a length of at least 0.56 inch (14.2 mm) but not more than 0.85 inch (21.6 mm), a length to diameter ratio of at least 0.5-0.75 to 1, according to ASTM D 3967-92 Standard Test Method for Splitting Tensile Strength of Intact Rock Core Specimens.

Sample 2-8 were prepared according to following procedure: 8 g of a selected adhesive made by using the typical synthetic procedure in Example 1 by replacing TOFA with S-rosin (CAS number 8050-09-7), was dissolved in 8 g of a selected solvent system listed in Table 1 at room temperature. S-Rosin is a rosin product commercially available from Ingevity Inc. of Charleston, S.C. DPM is dipropylenemethyl ether. A150 is ExxonMobil's Aromatic 150 solvent. CH$_3$OH is methanol.

TABLE 1

Solvent used for each sample

| Sample No. | Materials (Wt. %) DPM/A150/CH$_3$OH |
|---|---|
| 2 | 40/50/10 |
| 3 | 50/40/10 |
| 4 | 60/30/10 |
| 5 | 65/25/10 |

TABLE 1-continued

Solvent used for each sample

| Sample No. | Materials (Wt. %) DPM/A150/CH$_3$OH |
|---|---|
| 6 | 70/20/10 |
| 7 | 75/15/10 |

Sample 2-8 were coated and loaded to the UCS cell according to following procedure: To a beaker containing 200 g 40/70 mesh Hi-crush sand was added 4 g (2%) of the above liquid, and resulting mix was stirred with a spatula vigorously for 5 to 10 minutes, or until the chemical is evenly coated on the sand surface (no visible chemical drop left). To the beaker was added 139 g of 2% KCl solution, and the resulting mixture was mixed vigorously with a spatula for 5 to 10 minutes. The sand slurry was then loaded on a UCS cell following the general loading procedure described above. The cell is then transferred to an oven and maintained at 200° F. for 24 h. The cell was then moved from the oven, and the core extracted.

Figure 3:
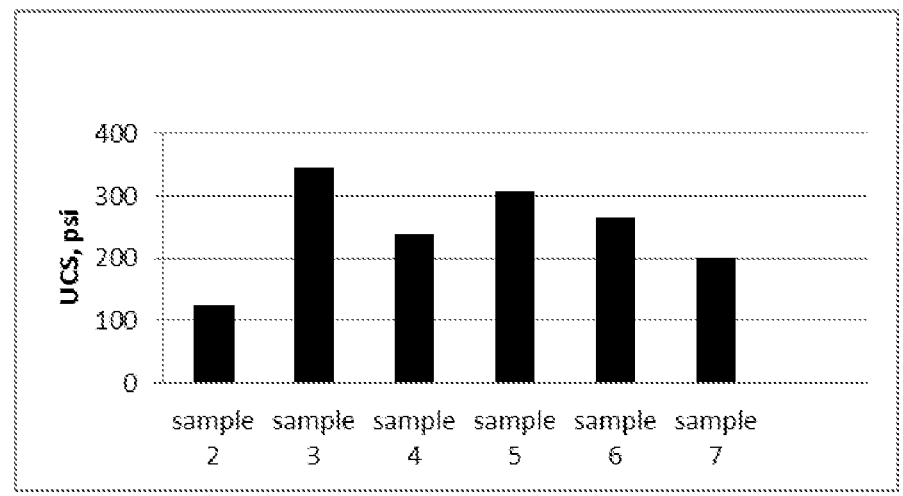
FIG. 3 is a graph showing the impact of solvent on UCS value of the coated proppant core.

The core was then dried in a dehumidifying chamber for at least 24 hours (h) before measuring the unconfined compressive strength. The results are shown on FIG. 3 (FIG. 3).

For conventional resin coated proppant, the UCS value is normally in 50-300 scale. It is obvious that adhesives of this invention provide outstanding UCS value, which is comparable to some resin coated proppants. Also, the solvent system seems to have impact to the UCS value, sample 3 and 5 seem to be the best one.

Example 4: Curable Coating for Flow-Back Control and Consolidation of Proppant Pack-Formulation and Evaluation of Unconfined Compressive Strength of Cross-Linked Resin The active adhesive compositions of sample 8, 9, 10, and 11 were made by using the typical synthetic procedure in Example 1 with the stoichiometry as shown in Table 2. DETA is diethylenetriamine. TOFA is tall oil fatty acid.

TABLE 2

Sample Molar Ratios

| Samples | Molar Ratios |
|---|---|
| 8 | terephthalic acid:DETA:rosin = 1:2:2 |
| 9 | terephthalic acid:DETA:rosin = 2:3.5:3 |
| 10 | terephthalic acid:DETA:rosin:TOFA = 1:2:1:1 |
| 11 | terephthalic acid:DETA:TOFA = 1:2:2 |

Sample 8, 9, 10, and 11 are formulated according to the following procedure. 8 g of a selected adhesive was dissolved in 8 g of a solvent combination (25% Aromatic 150 and 75% dipropylene glycol methyl ether) at room temperature. 2 g of Hexion's Epon 828 was added to the solution, and the resulting mixture was mixed with a spatula thoroughly to a homogeneous liquid.

To a beaker containing 200 g 40/70 mesh Hi-crush sand was added 4 g (2%) of the above liquid, and resulting mix was stirred with a spatula vigorously for 5 to 10 minutes, or until the chemical is evenly coated on the sand surface (no visible chemical drop left). To the beaker was added 139 g of 2% KCl solution, and the resulting mixture was mixed vigorously with a spatula for 5 to 10 minutes. The sand slurry was then loaded on a UCS cell following the general loading procedure described above. The cell is then transferred to an oven and maintained at 200° F. for 24 h. The cell was then moved from the oven, and the core extracted. The core was then dried in a dehumidifying chamber for at least 24 h before measuring the unconfined compressive strength (UCS). The results are shown on FIG. 4 (FIG. 4).

Figure 4:
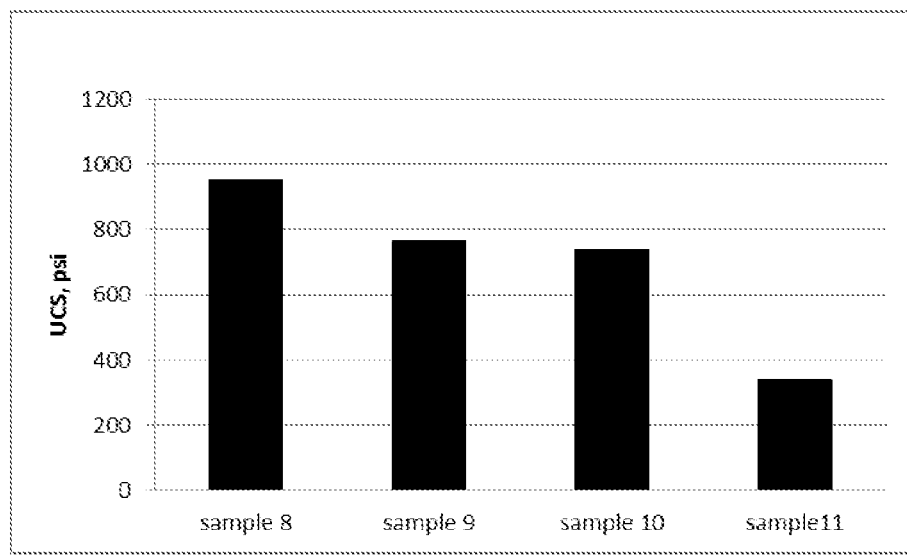
FIG. 4 is a graph showing the UCS value of proppant core coated with cross-linked adhesive of this invention.

From FIG. 4, samples 8 and 9 provided better UCS values than Sample 11. It indicates rosin derivative is better than TOFA for UCS. However, when the adhesive was made with the mixture of rosin and TOFA (Sample 10). The UCS value is as good as sample 8 and 9. Generally, the four samples all provided outstanding UCS values.

Example 5: Flow-Back Control Proppant Pack Failure Flow Rate Test

This following example was performed by the API standard test Flow Back Test 400-16-12-15-02-F, with the following procedure.

The coating sample was prepared in following manner: a coating composition: 8 g of a selected adhesive made by using the typical synthetic procedure in Example 1 by replacing TOFA with S-rosin (CAS number 8050-09-7), was dissolved in 8 g solvent (2 g Aromatic 150 (ExxonMobil) plus 6 g ethoxytriglycol (Dow)). The sand sample was coated at 1.5 wt. % level with the resulting composition. The coated sand and the uncoated sand were then subject to the following test.

The flow back conductivity cell is loaded per ISO 13503-5 procedures. The zero-pack width is measured and recorded. The flow back conductivity cell is placed onto the press and the closure stress is increased to 1,000 psi. The temperature was increased to 90° F. to allow the resin coated sand to cure for 24 hours. After the 24-hour period was complete, Nitrogen flow begins to remove any fluid from the cell and to ensure that the proppant pack is dry. The Nitrogen Flow is then stopped and the end slot is removed to allow the sand to flow out of the flow back cell. The flow of Nitrogen is resumed beginning at 10 L/min and increased 10 L/min until proppant pack failure occurs (proppant comes out of the cell). This same process is repeated for the 40/70 frac sand.

The coated sand having 1.5 wt. % of adhesive composition, exhibited a failure flow rate at 0.0566 lbs/min nitrogen, while the raw sand exhibited a failure flow rate at 0.0075 lbs/min nitrogen. This example illustrates that the composition herein demonstrated a 7.5 times improvement over the uncoated sand.

Example 6: UCS of Resin Coated Sand

For the following Examples, the Resin 1 (a base resin) is the product made by the process of Example 1 with the rosin replacing TOFA at the second step.

Resin 2 (an assisting resin) is the product made from Example 1.

Resin 3 (a second assisting resin) is Envacor 703 (From Ingevity) made by the following procedure. To a four-neck round bottom flask, equipped with a Dean Stark condenser, a mechanical agitator, and a thermal couple was added TOFA (1 equ.) and DETA (1 equ) at room temperature. The mixture was heated up to 260° C. in a 2 hours temperature ramp, and held for 3 h at 260° C., or until no water is released from the reactor. The reaction mixture was then cooled to room temperature, and the product is transferred to a container.

The crosslinking agent is diglycidyl ether.

The sand is Black Mountain (40/70) mesh silica sand.

In Example 6, the resins are premixed according to the designated ratio. The sand (240 g, Black Mountain, 40/70) was added to a beaker with 400 ml distilled water. The system was then agitated at 900-1500 RPM. To the system was added designated amount of the resin mixture, and the agitation was kept on for another minute. The coated sand was then loaded into the UCS cell, aged (14 hour), dried and tested, according to the procedure described in above paragraphs. The loading level is the dosage of the additive based on the total mass of the proppant. As one can see from Samples 12 and 13 of Table 3, assisting Resin 2 significantly improve the UCS of the core. This effect gets even more obvious when the loading level is increased to 1.5% (sample 14 vs sample 13).

TABLE 3

| Samples | Composition wt %:wt. %:wt % | Loading Level % | Aging Temperature °F. (°C.) | UCS Psi (Kpa) |
|---|---|---|---|---|
| 12 | Resin 1 (50%):Crosslinker (50%) | 1.0 | 325 (162.8) | 0 |
| 13 | Resin 1 (30%):Resin 2 (20%):Crosslinker (50%) | 1.0 | 325 (162.8) | 5 (34.5) |
| 14 | Resin 1 (50%):Crosslinker (50%) | 1.5 | 325 (162.8) | 14 (96.5) |
| 15 | Resin 1 (30%):Resin 2 (20%):Crosslinker (50%) | 1.5 | 325 (162.8) | 81 (558.5) |

Example 7: UCS of Resin Coated Sand

The procedure for Example 7 is the same as Example 6 except the sand is Superior Sand 100 mesh. From Table 4, one can see that the ratio between base resin and assisting resin has impact to the UCS of core. When the high melting Resin 1 at 40, 45%, the UCS of the cores are low. This is mainly attributed to the wetting ability of the resin mixer. High melting Resin 1 has poor wetting ability, compared to Resin 2 which has low melting point. When Samples 16 and 17 formula coat the dusty sand (Superior 100 mesh) in the tub, the coating layer cannot be distributed evenly, which results in the coated sand pack with deficits that reduces the strength of the core. When assisting resin percentage is increased to 20, the UCS reaches the maximum value. Further increased assisting resin (Samples 19 and 20), although increasing the wetting ability of the coating, does not increased the UCS value because the polymer chain of the assisting resin is soft.

TABLE 4

| Samples | Composition wt %:wt. %:wt % | Loading Level | Aging Temperature °F. (°C.) | UCS, Psi (Kpa) |
|---|---|---|---|---|
| 16 | Resin 1 (45%):Resin 2 (5%):Crosslinker (50%) | 2.0 | 325 (162.8) | 49 (337.8) |
| 17 | Resin 1 (40%):Resin 2 (10%):Crosslinker (50%) | 2.0 | 325 (162.8) | 33 (227.5) |
| 18 | Resin 1 (30%):Resin 2 (20%):Crosslinker (50%) | 2.0 | 325 (162.8) | 75 (517.1) |
| 19 | Resin 1 (20%):Resin 2 (30%):Crosslinker (50%) | 2.0 | 325 (162.8) | 55 (379.2) |
| 20 | Resin 1 (10%):Resin 2 (40%):Crosslinker (50%) | 2.0 | 325 (162.8) | 53 (365.4) |

Example 8: UCS of Resin Coated Sand

The procedure for Example 8 is the same as Example 6 except the sand is Superior Sand 40/70 mesh. From Table 5 illustrates that both Resin 2 and Resin 3 improved the UCS of cores of Superior 40/70 mesh sand. The synergistic effect is obvious with assisting Resin 3 showing more than 100% improvement.

TABLE 5

| Samples | Composition wt %:wt. %:wt % | Loading Level | Aging Temperature °F. (°C.) | UCS Psi (Kpa) |
|---|---|---|---|---|
| 21 | Resin 1 (50%):Crosslinker 1 (50%) | 1.5 | 325 (162.8) | 77 (530.9) |
| 22 | Resin 1 (30%):Resin 2 (20%):Crosslinker 1 (50%) | 1.5 | 325 (162.8) | 91 (627.4) |
| 23 | Resin 1 (27%):Resin 2 (18%):Resin 3 (5%):Crosslinker 1 (50%) | 1.5 | 325 (162.8) | 204 (1406.5) |

While the foregoing is directed to embodiments of the present disclosure, other and further embodiments of the disclosure may be devised without departing from the basic scope thereof, and the scope thereof is determined by the claims that follow.

What is claimed is:

1. A composition, comprising:
   from about 15 wt. % to about 65 wt. % of a first resin based on a total wt. % of the composition, the first resin comprising:
      a first reaction product of:
         a first polyacid selected from the group consisting of an aromatic polyacid, an aliphatic polyacid, an aliphatic polyacid with an aromatic group, and combinations thereof; and
         a first polyamine; and
      a cyclic aliphatic monoacid with a C7-C30 cyclic aliphatic group;
   from about 10 wt. % to about 45 wt. % of a second resin based on the total wt. % of the composition, the second resin comprising:
      a second reaction product of:
         a second polyacid selected from the group consisting of an aromatic polyacid, an aliphatic polyacid, an aliphatic polyacid with an aromatic group, and combinations thereof, the second polyacid and the first polyacid being the same or different; and
         a second polyamine; and
      an acyclic aliphatic monoacid having a C2-C26 alkyl group, the acyclic aliphatic monoacid being branched or linear; and
   from about 5 wt. % to about 75 wt. % of a cross-linking agent based on the total wt. % of the composition, wherein the total wt. % of the composition is 100 wt. %,
   wherein the first resin is crosslinked to the second resin by the cross-linking agent, and
   wherein the first resin and the second resin are different.

2. The composition of claim 1, wherein the first resin is made from the formulation comprising:
from about 30 wt. % to about 60 wt. % of the first reaction product based on a total wt. % of the first resin, wherein the first reaction product comprises:
from about 15 wt. % to about 85 wt. % of the first polyacid based on a total wt. % of the first polyacid and the first polyamine; and
from about 15 wt. % to about 85 wt. % of the first polyamine based on the total wt. % of the first polyacid and the first polyamine, wherein the total wt. % of the first polyacid and the first polyamine is 100 wt. %; and
from about 40 wt. % to about 70 wt. % of the cyclic aliphatic monoacid based on the total wt. % of the first resin, wherein the total wt. % of the first resin is 100 wt. %.

3. The composition of claim 1, wherein the second resin is made from the formulation comprising:
from about 30 wt. % to about 60 wt. % of the second reaction product based on a total wt. % of the second resin, wherein the second reaction product comprises:
from about 15 wt. % to about 85 wt. % of the second polyacid based on a total wt. % of the second polyacid and the second polyamine; and
from about 15 wt. % to about 85 wt. % of the second polyamine based on the total wt. % of the second polyacid and the second polyamine, wherein the total wt. % of the second polyacid and the second polyamine is 100 wt. %; and
from about 40 wt. % to about 70 wt. % of the acyclic aliphatic monoacid based on the total wt. % of the second resin, wherein the total wt. % of the second resin is 100 wt. %.

4. The composition of claim 1, wherein each of the first polyacid and the second polyacid independently comprises a diacid selected from the group consisting of aromatic diacid, aliphatic diacid, aliphatic diacid with an aromatic group, and combinations thereof.

5. The composition of claim 1, wherein each of the first polyamine and the second polyamine independently comprises a diamine selected from the group consisting of polyethylenepolyamines, C2-C12 linear diamines, cyclic diamines, diamine with aromatic content, polyetherdiamines, polyoxyalkylene diamines, and combinations thereof.

6. The composition of claim 1, wherein the cross-linking agent comprises a crosslinking resin having the following general structure:

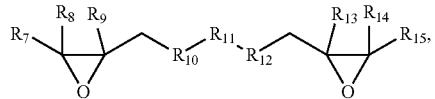

wherein:
each of R7, R8, R9, R13, R14, and R15 are hydrogen atoms, C1-C20 aliphatic groups, aromatic groups, aromatic substituted aliphatic groups, or aliphatic aromatic groups;
each of R10 and R12 are oxygen atoms, sulfur atoms, or C1-C10 aliphatic groups; and
R11 is a C1-C24 aliphatic, aromatic, aromatic substituted aliphatic, or aliphatic substituted aromatic group.

7. The composition of claim 1, wherein the composition further comprises a solvent selected from the group consisting of aromatic solvents, ethers, alcohols, and water.

8. The composition of claim 1, wherein:
the first resin is further crosslinked with itself by the cross-linking agent;
the second resin is further crosslinked with itself by the cross-linking agent; or
combinations thereof.

9. The composition of claim 1, wherein the first reaction product and the second reaction product are different.

* * * * *